United States Patent
Henze et al.

(10) Patent No.: US 11,766,089 B2
(45) Date of Patent: Sep. 26, 2023

(54) ULTRA-LIGHT SKIING BOOTS

(71) Applicant: BASF SE, Ludwigshafen am Rhein (DE)

(72) Inventors: Oliver Steffen Henze, Lemfoerde (DE); Denis Bouvier, Lyons (FR)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/756,741

(22) PCT Filed: Dec. 4, 2020

(86) PCT No.: PCT/EP2020/084648
§ 371 (c)(1),
(2) Date: Jun. 1, 2022

(87) PCT Pub. No.: WO2021/110922
PCT Pub. Date: Jun. 10, 2021

(65) Prior Publication Data
US 2022/0354213 A1    Nov. 10, 2022

(30) Foreign Application Priority Data
Dec. 5, 2019 (EP) .................. 19213834

(51) Int. Cl.
| | |
|---|---|
| A43B 5/04 | (2006.01) |
| C08G 18/32 | (2006.01) |
| C08G 18/48 | (2006.01) |
| A43B 1/14 | (2006.01) |
| C08G 18/10 | (2006.01) |
| C08G 18/66 | (2006.01) |
| C08G 18/76 | (2006.01) |
| C08K 7/28 | (2006.01) |

(52) U.S. Cl.
CPC .............. *A43B 5/049* (2013.01); *A43B 1/14* (2013.01); *C08G 18/10* (2013.01); *C08G 18/3206* (2013.01); *C08G 18/4854* (2013.01); *C08G 18/667* (2013.01); *C08G 18/7671* (2013.01); *C08K 7/28* (2013.01); *C08K 2201/003* (2013.01)

(58) Field of Classification Search
CPC .................. A43B 5/049; A43B 1/14
See application file for complete search history.

(56) References Cited

U.S. PATENT DOCUMENTS

| | | | |
|---|---|---|---|
| 8,507,633 B2 | 8/2013 | Henze et al. | |
| 2005/0027025 A1* | 2/2005 | Erb ................ | A43B 17/003 521/50 |
| 2009/0069526 A1* | 3/2009 | Henze ................ | A43B 5/04 528/65 |
| 2018/0352894 A1 | 12/2018 | Stefan | |
| 2021/0230349 A1 | 7/2021 | Henze et al. | |

FOREIGN PATENT DOCUMENTS

| | | |
|---|---|---|
| CA | 2011871 | 9/1990 |
| CN | 104650315 | 5/2015 |
| DE | 10103424 | 8/2002 |
| EP | 0 379 149 | 7/1990 |
| EP | 0 390 148 | 10/1990 |
| EP | 0 922 552 | 6/1999 |
| EP | 1 599 522 | 7/2009 |
| EP | 1 456 272 | 8/2012 |
| WO | 2006/072461 | 7/2006 |
| WO | 2007/118827 | 10/2007 |
| WO | 2019/234117 | 12/2019 |

OTHER PUBLICATIONS

Im et al., "Fabrication of Novel Polyurethane Elastomer Composites Containing Hollow Glass Microspheres and Their UndenNater Applications", Industrial and Enginering Chemical Research, vol. 50, 2011, pp. 7305-7312.
Kunststoffhandbuch, vol. VII, edited by Vieweg and Höchtlen, Carl Hanser Verlag, Munich, 1966, pp. 103-113.
International Preliminary Report on Patentability dated Nov. 11, 2021 in PCT/EP2020/084648, 8 pages.
International Search Report dated Feb. 22, 2021 in PCT/EP2020/084648, 4 pages.
Written Opinion dated Feb. 22, 2021 in PCT/EP2020/084648, 10 pages.

\* cited by examiner

*Primary Examiner* — Michael L Leonard
(74) *Attorney, Agent, or Firm* — Grüneberg and Myers PLLC

(57) ABSTRACT

A composition contains a thermoplastic polyurethane (TPU-1), obtained or obtainable by reaction of an isocyanate composition (IZ) containing MDI with a polyol composition (PZ), and hollow glass microspheres. The polyol composition (PZ) contains at least one polyol (P1) selected from polytetrahydrofurans having an average molecular weight Mn in the range from 900 to 2,000 g/mol. The polyol composition (PZ) also contains a chain extender (KV1), selected from 1,2-ethandiol, 1,3-propanediol, 1,4-butanediol and 1,6-hexanediol. Ski shoes, preferably ski boots, particularly preferably the outer shell of a ski boot, can be based on such a thermoplastic polyurethane. Corresponding processes can be used for producing ski shoes.

20 Claims, No Drawings

ULTRA-LIGHT SKIING BOOTS

CROSS-REFERENCE TO RELATED APPLICATIONS

This application is the National Stage entry under § 371 of International Application No. PCT/EP2020/084648, filed on Dec. 4, 2020, and which claims the benefit of priority to European Application No. 19213834.5, filed on Dec. 5, 2019. The content of each of these applications is hereby incorporated by reference in its entirety.

BACKGROUND OF THE INVENTION

Field of the Invention

The present invention relates to a composition comprising a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 900 to 2000 g/mol and a chain extender (KV1), selected from the group consisting of 1,2-ethandiol, 1,3-propanediol, 1,4-butanediol and 1,6-hexanediol; and hollow glass microspheres. The invention further relates to ski shoes, preferably ski boots, particularly preferably the outer shell of a ski boot, based on such a thermoplastic polyurethane and processes for producing ski shoes.

Description of Related Art

The production of ski shoes, for example ski boots, in particular the outer hard shells of ski boots, from thermoplastics by injection molding is common knowledge.

Thus WO 2007/118827A1 discloses ski shoes based on thermoplastic polyurethane obtainable by conversion of isocyanates with isocyanate-reactive compounds having a molecular weight (Mw) between 500 and 10 000 g/mol and chain extenders having a molecular weight between 50 and 499 g/mol, wherein the chain extender employed is a mixture comprising a main chain extender and one or more co-chain extenders.

PCT/EP2019/064694 relates to a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) and a chain extender (KV1), wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol and the use thereof for the preparation of ski shoes, in particular ski boots.

US 2018/0352894 reports sports boots comprising a material comprising a polymer, for example a thermoplastic polyurethane and a hollow microball filler.

There is a need in ski boot development especially to reduce the total weight of the ski boot. The wall thickness of the outer shell of the ski boot is thus often reduced.

The profile of requirements of thermoplastic polyurethane suitable for producing such ski boots, in particular the outer shell thereof, is complex. The low temperature properties should be very good, i.e. the material should exhibit sufficient flexibility at the usage temperatures and not break or splinter. The material must also have a very high stiffness so that even at low wall thicknesses a sufficient stiffness of the ski boot is achievable preferably in combination with a low density of the material. It is also advantageous when the stiffness varies as little as possible over the temperature range from −30-20° C. since this makes the handling characteristics of the ski boot temperature-independent.

SUMMARY OF THE INVENTION

The materials known from the prior art provide only inadequate fulfillment of these requirements. It is accordingly an object of the present invention to develop thermoplastic polyurethanes for producing ski boots which combine a very high stiffness with excellent low-temperature properties and a low density.

This object is achieved in accordance with the invention by a composition comprising
  (i) a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 900 to 2000 g/mol and a chain extender (KV1), selected from the group consisting of 1,2-ethandiol, 1,3-propanediol, 1,4-butanediol and 1,6-hexanediol; and
  (ii) hollow glass microspheres.

It is furthermore achieved by a process for producing a ski shoe or a part of a ski shoe or protective wear or a part of protective wear, comprising the steps of
  (A) providing a composition comprising
    (i) a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 1200 to 2000 g/mol and a chain extender (KV1), selected from the group consisting of 1,2-ethandiol, 1,3-propanediol, 1,4-butanediol and 1,6-hexanediol; and
    (ii) hollow glass microspheres;
  (B) producing a ski shoe or a part of a ski shoe or protective wear or a part of protective wear from the composition provided according to step (A).

It has now been found that, surprisingly, the combination of thermoplastic polyurethane (TPU-1) obtained or obtainable using a specific isocyanate component and polyol component in combination with the uses of hollow glass microspheres affords a composition having a profile of properties that is particularly suitable for the production of ski boots. The composition according to the present invention has a low density and typically an elastic modulus of greater than 150 MPa.

DETAILED DESCRIPTION OF THE INVENTION

The composition according to the present invention comprises a thermoplastic polyurethane (TPU-1) and hollow glass microspheres. The thermoplastic polyurethane (TPU-1) is obtained or obtainable by reaction of an isocyanate composition (IZ) comprising MDI with a polyol composition (PZ). The polyol composition (PZ) comprises at least one polyol (P1) selected from polytetrahydrofurans having an average molecular weight Mn in the range from 900 to 2000 g/mol and a chain extender (KV1), selected from the group consisting of 1,2-ethandiol, 1,3-propanediol, 1,4-butanediol and 1,6-hexanediol.

According to the invention the isocyanate composition (IZ) comprising MDI is reacted with a polyol composition (PZ) which comprises at least one polyol (P1) and a chain extender (KV1). In the context of the present invention the polyol composition (PZ) may comprise further polyols or further chain extenders. The isocyanate component (IZ) too may comprise further isocyanates in addition to MDI.

Thermoplastic polyurethanes are known in principle. They are typically produced by reaction of isocyanates and isocyanate-reactive compounds and optionally chain extenders optionally in the presence of at least one catalyst and/or customary auxiliaries and/or additives. Isocyanates, isocyanate-reactive compounds and chain extenders are also referred to, individually or collec-tively, as building block components.

According to the invention the polyol component comprises at least the polyol (P1) as the isocy-anate-reactive compound. In the context of the present invention the polyol (P1) is selected from polytetrahydrofurans having an average molecular weight Mn in the range from 1200 to 2000 g/mol, preferably from polytetrahydrofurans having an average molecular weight Mn in the range from 1300 to 1900 g/mol, more preferably from polytetrahydrofurans having an average molecular weight Mn in the range from 1400 to 1800 g/mol, for example in the range from 1500 to 1700 g/mol.

It has now been found that, surprisingly, the compositions according to the invention exhibit sufficient hardness to be used for producing ski boots in particular and despite the molecular weight of the employed polyols are readily colorable.

In a further embodiment the present invention accordingly provides a thermoplastic polyurethane as described hereinabove, wherein the polyol (P1) is selected from polytetrahydrofurans having an average molecular weight Mn in the range from 1300 to 1900 g/mol.

However, in the context of the present invention the polyol component may also comprise further isocyanate-reactive compounds.

Further isocyanate-reactive compounds that may be employed in principle include all suitable compounds known to those skilled in the art. It is thus possible in the context of the present invention to employ any suitable diols, for example further polyether diols.

In the context of the present invention the chain extender (KV1) is selected from the group consisting of 1,3-propanediol, 1,4-butanediol and 1,6-hexanediol. It is also possible according to the invention to employ two or more chain extenders, for example mixtures of 1,4-butanediol and a further chain extender. It is preferable in the context of the present invention to employ only one chain extender (KV1).

In the context of the present invention it is preferable to employ 1,4-butandiol as the chain extender. In a further embodiment the present invention accordingly relates to a thermoplastic polyurethane as described hereinabove, wherein the chain extender (KV1) is 1,4-butanediol.

In the context of the present invention the isocyanate composition (IZ) comprising MDI is employed in the production of the thermoplastic polyurethane (TPU-1).

According to the invention 2,2'-, 2,4'- and/or 4,4'-diphenylmethanediisocyanate (MDI) may be employed. It is particularly preferable to employ only 4,4'-MDI.

In a further embodiment the present invention accordingly relates to a composition as described hereinabove, wherein the thermoplastic polyurethane is based on 4,4'-diphenylmethane diiso-cyanate (MDI).

The thermoplastic polyurethane of the ski shoe according to the invention preferably has a hard phase fraction of greater than 0.4, particularly preferably greater than 0.5. In a further embodiment the present invention accordingly provides a thermoplastic polyurethane as described hereinabove, wherein the thermoplastic polyurethane has a hard phase fraction of greater than 0.40, wherein the hard phase fraction is defined by the following formula:

$$\text{Hard phase fraction} = \left\{ \sum_{x=1}^{x} [(m_{KVx}/M_{KVx}) * M_{Iso} + m_{KVx}] \right\} / m_{ges}$$

having the following definitions:
$M_{KVx}$: molar mass of the chain extender x in g/mol
$m_{KVx}$: mass of the chain extender x in g
$M_{Iso}$: molar mass of the employed isocyanate in g/mol
$m_{ges}$: total mass of all starting materials in g
x: number of chain extenders.

The thermoplastic polyurethanes according to the invention preferably have an elastic modulus in the range from 150 to 1100 MPa, more preferably in the range from 400 to 1000 MPa500900.

The thermoplastic polyurethanes according to the invention have good low-temperature properties. These may be characterized for example by the Charpy notched impact strength at −20° C.

In another embodiment the present invention also relates to a thermoplastic polyurethane (TPU-1) which has a Charpy notched impact strength at −20° C. according to DIN EN ISO 179-1/1 eA of greater than 5 kJ/m$^2$, preferably of greater than 10 kJ/m$^2$. For example in the context of the present invention the thermoplastic polyurethane may have an elastic modulus of about 500 MPa.

To adjust the hardness of the TPU the building block components may be varied within relative-ly wide molar ratios. Advantageous molar ratios of polyols to total chain extenders to be employed are for example from 1:1 to 1:15, preferably from 1:4 to 1:12, in particular from 1:5 to 1:10, more preferably from 1:5 to 1:8, wherein the hardness of the TPU increases with in-creasing content of chain extender.

The reaction may be carried out at customary indices, preferably at an index between 950 and 1050, particularly preferably at an index between 970 and 1010, in particular between 980 and 1000, more preferably in the range from 992 to 998. The index is defined as the ratio of the total isocyanate groups employed in the reaction to the isocyanate-reactive groups, i.e. the active hydrogens. An index of 1000 corresponds to one active hydrogen atom, i.e. one isocyanate-reactive function, per isocyanate group. At indices above 1000 more isocyanate groups than OH groups are present. The TPUs may be produced continuously by the known processes, for example using reactive extruders or the belt process by the "one-shot" process or the prepolymer process, or discontinuously by the known prepolymer process. In these processes the components to be reacted may be mixed with one another successively or simultaneously, with immediate onset of reaction. In the extruder process the building block components and optionally catalysts and/or further auxiliary and additive substances are introduced into the extruder individually or as a mixture, for example at temperatures of 100° C. to 280° C., preferably 140° C. to 250° C., and the obtained TPU is extruded, cooled and pelletized.

Catalysts and assistant or additive substances employed for the production of thermoplastic polyurethanes are known per se to those skilled in the art.

In a preferred embodiment catalysts which accelerate especially the reaction between the NCO groups of the diisocyanates and the hydroxyl groups of the isocyanate-reactive compound and the chain extender are tertiary amines, especially triethylamine, dimethylcyclohexylamine, N-methylmorpholine, N,N'-dimethylpiperazine, 2-(dimethylaminoethoxy)ethanol, diazabicy-clo[2.2.2]octane; in another preferred embodiment, these are organic metal compounds such as titanate esters, iron compounds, preferably iron(III) acetylacetonate, tin compounds, preferably tin diacetate, tin dioctoate, tin dilaurate or the dialkyltin salts of aliphatic carboxylic acids, preferably dibutyltin diacetate, dibutyltin dilaurate, or bismuth salts in which bismuth is preferably in oxidation states 2 or 3, especially 3. Salts of carboxylic acids are preferred. Preferably employed carboxylic acids are carboxylic acids having 6 to 14 carbon atoms, particularly preferably having 8 to 12 carbon atoms. Examples of suitable bismuth salts are bismuth(III) neodecanoate, bismuth 2-ethylhexanoate and bismuth octanoate.

The catalysts are preferably employed in amounts of 0.0001 to 0.1 parts by weight per 100 parts by weight of the isocyanate-reactive compound. Preference is given to using tin catalysts, especially tin dioctoate.

In addition to catalysts it is also possible to employ customary auxiliaries. Examples include surface-active substances, fillers, further flame retardants, nucleation agents, oxidation stabilizers, lubrication and demolding aids, dyes and pigments, optionally stabilizers, for example against hydrolysis, light, heat or discoloration, inorganic and/or organic fillers, reinforcers and plasticizers. Suitable auxiliary and/or additive substances may be found for example in Kun-ststoffhandbuch, volume VII, edited by Vieweg and Höchtlen, Carl Hanser Verlag, Munich 1966 (p. 103-113).

Production processes for thermoplastic polyurethanes are disclosed for example in EP 0 922 552 A1, DE 101 03 424 A1 or WO 2006/072461 A1. Production is typically effected on a belt apparatus or in a reactive extruder, but can also be effected on the laboratory scale, for example in a manual casting method. Depending on the physical properties of the components these are all mixed with one another directly or individual components are premixed and/or prereact-ed, for example to give prepolymers, and only then subjected to polyaddition. In a further embodiment a thermoplastic polyurethane is first produced from the building block components, optionally together with catalyst, into which auxiliaries may optionally also be incorporated. Ho-mogeneous distribution is preferably effected in an extruder, preferably in a twin-screw extruder.

To produce the thermoplastic polyurethanes according to the invention the building block components, preferably in the presence of catalysts and optionally auxiliaries and/or additives, are typically reacted in amounts such that the equivalent ratio of NCO groups of the diisocyanates to the sum of the hydroxyl groups of the employed components is 0.95 to 1.05:1, preferably 0.98 to 1.00:1, more preferably 0.992 to 0.998:1.

Preferably produced according to the invention are thermoplastic polyurethanes where the thermoplastic polyurethane has an average molecular weight (Mw) in the range from 50 000 to 200 000 Dalton, preferably in the range from 80 000 to 120 000 Dalton. The upper limit for the average molecular weight (Mw) of the thermoplastic polyurethanes is generally determined by processability as well as the spectrum of properties desired.

The composition according to the present invention further comprises hollow glass microspheres. Hollow glass microspheres are in principle known to the person skilled in the art. Suitable are for example hollow glass microspheres prepared using borosilicate glass, for example soda-lime borosilicate glass.

Thus, according to a further embodiment, the present invention also relates to a composition as disclosed above, wherein the glass is a soda-lime borosilicate glass.

The diameter of the hollow glass microspheres can vary in wide ranges. Suitable are for example microspheres having an average diameter in the range of from 5 to 100 μm, preferably in the range of from 10 to 75 μm, more preferable in the range of from 20 to 50 μm, for example in a range of from 20 to 40 μm.

Thus, according to a further embodiment, the present invention also relates to a composition as disclosed above, wherein the microspheres have an average diameter in the range of from 5 to 100 μm.

It has been found that it is particularly advantageous to use the hollow glass microspheres in an amount of from 1 to 25 weight % based on the sum of the components (i) and (ii). More preferable, the amount of the hollow glass microspheres in the composition is in the range of from 2 to 15 weight % based on the sum of the components (i) and (ii), in particular in the range of from 5 to 10 weight % based on the sum of the components (i) and (ii).

Thus, according to a further embodiment, the present invention also relates to a composition as disclosed above, wherein the composition comprises the microspheres in an amount of from 1 to 25 weight % based on the sum of the components (i) and (ii).

The composition according to the present invention typically has a density of below 1.1 $g/cm^3$ and typically an elastic modulus of greater than 150 MPa. Furthermore, the impact strength and the notch impact strength at −20° C. typically is greater than 5 $kJ/m^2$.

In a further aspect the present invention accordingly also relates to a process for producing a ski shoe or a part of a ski shoe, comprising the steps of (A) providing a composition comprising
  (i) a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 1200 to 2000 g/mol and a chain extender (KV1), selected from the group consisting of 1,2-ethandiol, 1,3-propanediol, 1,4-butanediol and 1,6-hexanediol; and
  (ii) hollow glass microspheres;
(B) producing a ski shoe or a part of a ski shoe from the composition provided in step (A).

Processes for preparing the composition according to the present invention are in principle known to the person skilled in the art. It has been found that it is advantageous to apply only little shear force when preparing the compositions according to the present invention.

The producing of step (B) may be effected using processes which are customary per se, preferably by injection molding. In a further embodiment the present invention accordingly also relates to a process as described hereinabove, wherein the composition is processed by injection molding according to step (B).

Furthermore, the present invention also relates to the use of a composition as disclosed above for the production of ski shoes or parts of ski shoes, or for the production of protective wear, in particular helmets.

In respect of the preferred embodiments the above explanations concerning the preferably employed components are hereby incorporated by reference.

The invention further relates to ski shoes, preferably ski boots, particularly preferably the outer shell of a ski boot, based on the above-described composition. In addition the invention relates to processes for producing ski shoes, preferably ski boots, particularly preferably the outer shell of a ski boot, wherein the composition according to the invention is processed by injection molding to afford a ski shoe, preferably ski boot, particularly preferably the outer shell of a ski boot.

The invention further relates to protective wear, preferably helmets, based on the above-described composition. In addition the invention relates to processes for producing protective wear, preferably helmets, wherein the composition according to the invention is processed by injection molding to afford protective wear, preferably a helmet.

The composition according to the invention is used for the production of ski shoes, preferably ski boots, in particular the outer shells of ski boots, ski boot heels, cuffs for the shaft of a ski boot, protective wear, in particular helmets, and decorative elements. Production of these prod-ucts using customary injection molding processes is common knowledge.

In a further aspect the present invention accordingly also relates to a ski shoe or part of a ski shoe obtained or obtainable by a process as described hereinabove. In respect of preferred embodiments the above explanations are hereby incorporated by reference.

Further embodiments of the present invention are apparent from the description and the examples. It will be appreciated that the features of the subject matter/process according to the invention or of the uses according to the invention recited hereinabove and elucidated hereinbelow may be used not only in the combination specified in each case but also in other combinations without departing from the scope of the invention. Thus for example the combination of a preferred feature with a particularly preferred feature or of a feature not characterized further with a particularly preferred feature etc. is thus also encompassed implicitly even if this combination is not mentioned explicitly.

Exemplary embodiments of the present invention are described hereinbelow but are not intended to restrict the present invention. In particular the present invention also encompasses those embodiments that result from the dependency references and hence combinations specified hereinbelow.

1. A composition comprising
   (i) a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 900 to 2000 g/mol and a chain extender (KV1), selected from the group consisting of 1,2-ethandiol, 1,3-propanediol, 1,4-butanediol and 1,6-hexanediol; and
   (ii) hollow glass microspheres.
2. The composition according to embodiment 1, wherein the polyol (P1) is selected from polytetrahydrofurans having an average molecular weight Mn in the range from 1300 to 1900 g/mol.
3. The composition according to embodiment 1 or 2, wherein the chain extender (KV1) is 1,4-butanediol.
4. The composition according to any of embodiments 1 to 3, wherein the thermoplastic polyurethane has a hard phase fraction of greater than 0.40, wherein the hard phase fraction is defined by the following formula $$\text{Hard phase fraction} = \left\{ \sum_{x=1}^{x} [(m_{KVx}/M_{KVx}) * M_{Iso} + m_{KVx}] \right\} \Big/ m_{ges}$$

having the following definitions:
$M_{KVx}$: molar mass of the chain extender x in g/mol
$m_{KVx}$: mass of the chain extender x in g
$M_{Iso}$: molar mass of the employed isocyanate in g/mol
$m_{ges}$: total mass of all starting materials in g
x: number of chain extenders.
5. The composition according to any of embodiments 1 to 4, wherein the glass is a soda-lime borosilicate glass.
6. The composition according to any of embodiments 1 to 5, wherein the microspheres have an average diameter in the range of from 5 to 100 µm.
7. The composition according to any of embodiments 1 to 6, wherein the composition comprises the microspheres in an amount of from 1 to 25 weight % based on the sum of the components (i) and (ii).
8. A process for producing a ski shoe or a part of a ski shoe, comprising the steps of
   (A) providing a composition comprising
      (i) a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 1200 to 2000 g/mol and a chain extender (KV1), selected from the group consisting of 1,2-ethandiol, 1,3-propanediol, 1,4-butanediol and 1,6-hexanediol; and
      (ii) hollow glass microspheres;
   (B) producing a ski shoe or a part of a ski shoe from the composition provided according to step (A).
9. The process according to embodiment 8, wherein the polyol (P1) is selected from polytetrahydrofurans having an average molecular weight Mn in the range from 1300 to 1900 g/mol.
10. The process according to embodiment 8 or 9, wherein the chain extender (KV1) is 1,4-butanediol.
11. The process according to any of embodiments 8 to 10, wherein the thermoplastic polyurethane has a hard phase fraction of greater than 0.40, wherein the hard phase fraction is defined by the following formula $$\text{Hard phase fraction} = \left\{ \sum_{x=1}^{x} [(m_{KVx}/M_{KVx}) * M_{Iso} + m_{KVx}] \right\} \Big/ m_{ges}$$

having the following definitions:
$M_{KVx}$: molar mass of the chain extender x in g/mol
$m_{KVx}$: mass of the chain extender x in g
$M_{Iso}$: molar mass of the employed isocyanate in g/mol
$m_{ges}$: total mass of all starting materials in g
x: number of chain extenders.
12. The process according to any of embodiments 8 to 11, wherein the glass is a soda-lime borosilicate glass.

13. The process according to any of embodiments 8 to 12, wherein the microspheres have an average diameter in the range of from 5 to 100 µm.
14. The process according to any of embodiments 8 to 13, wherein the composition comprises the microspheres in an amount of from 1 to 25 weight % based on the sum of the components (i) and (ii).
15. The process according to any of embodiments 8 to 14, wherein the composition is processed by injection molding according to step (B).
16. A ski shoe or part of a ski shoe obtained or obtainable according to a process according to any of embodiments 8 to 15.
17. A ski shoe or part of a ski shoe obtained or obtainable according to a process comprising the steps of
    (A) providing a composition comprising
        (i) a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 1200 to 2000 g/mol and a chain extender (KV1), selected from the group consisting of 1,2-ethandiol, 1,3-propanediol, 1,4-butanediol and 1,6-hexanediol; and
        (ii) hollow glass microspheres;
    (B) producing a ski shoe or a part of a ski shoe from the composition provided according to step (A).
18. Use of a composition according to any one of embodiments 1 to 7 for the preparation of a ski shoe or part of a ski shoe or protective wear.
19. A process for producing protective wear or a part of protective wear, comprising the steps of
    (A) providing a composition comprising
        (i) a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 1200 to 2000 g/mol and a chain extender (KV1), selected from the group consisting of 1,2-ethandiol, 1,3-propanediol, 1,4-butanediol and 1,6-hexanediol; and
        (ii) hollow glass microspheres;
    (B) producing protective wear or a part of protective wear from the composition provided according to step (A).
20. The process according to embodiment 19, wherein the polyol (P1) is selected from polytetrahydrofurans having an average molecular weight Mn in the range from 1300 to 1900 g/mol.
21. The process according to embodiment 19 or 20, wherein the chain extender (KV1) is 1,4-butanediol.
22. The process according to any of embodiments 19 to 21, wherein the thermoplastic polyurethane has a hard phase fraction of greater than 0.40, wherein the hard phase fraction is defined by the following formula $$\text{Hard phase fraction} = \left\{ \sum_{x=1}^{x} [(m_{KVx}/M_{KVx}) * M_{Iso} + m_{KVx}] \right\} / m_{ges}$$

having the following definitions:
$M_{KVx}$: molar mass of the chain extender x in g/mol
$m_{KVx}$: mass of the chain extender x in g $M_{Iso}$: molar mass of the employed isocyanate in g/mol
$m_{ges}$: total mass of all starting materials in g
x: number of chain extenders.

23. The process according to any of embodiments 19 to 22, wherein the glass is a soda-lime borosilicate glass.
24. The process according to any of embodiments 19 to 23, wherein the microspheres have an average diameter in the range of from 5 to 100 µm.
25. The process according to any of embodiments 19 to 24, wherein the composition comprises the microspheres in an amount of from 1 to 25 weight % based on the sum of the components (i) and (ii).
26. The process according to any of embodiments 19 to 25, wherein the composition is processed by injection molding according to step (B).
27. Protective wear or a part of protective wear obtained or obtainable according to a process according to any of embodiments 19 to 26.
28. Protective wear or a part of protective wear obtained or obtainable according to a process comprising the steps of
    (A) providing a composition comprising
        (i) a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) selected from polytetrahydrofurans having an average molecular weight Mn in the range from 1200 to 2000 g/mol and a chain extender (KV1), selected from the group consisting of 1,2-ethandiol, 1,3-propanediol, 1,4-butanediol and 1,6-hexanediol; and
        (ii) hollow glass microspheres;
    (B) producing Protective wear or a part of protective wear from the composition provided according to step (A).

The examples which follow are intended to illustrate the invention but are in no way intended to restrict the subject matter of the present invention.

EXAMPLES

1. Materials Used iMK16 Glass bubbles from 3M Speciality Materials: GLASS BUBBLES IM16K, Target crush strength (90% survival): 16000 psi, true density of 0.46 g/cm$^3$, particle size distribution (10%) 3M QCM 193.2:12 µm by volume, particle size distribution (50%) 3M QCM 193.2:20 µm by volume, particle size distribution (90%) 3M QCM 193.2:30 µm by volume, effective top size, 3M QCM 193.2:40 µm by volume, alka-linity <0.5 meq/g.

TPU 1: Elastollan 1157D13U from BASF Polyurethanes GmbH Lemförde: TPU with Shore hardness 57D, based on PTHF with an average molecular weight (Mn) of 1700 Dalton, 1,4-butanediol, MDI

2. Example 2—Production of Materials

The materials according to examples 1 to 4 were produced using a ZE 40 A twin-screw extruder from company Berstorff with a 35 D screw divided into 10 barrels. The formula-tions for the individual materials are summarized in table 1.

TABLE 1

Formulations

| Material/example | 1 | 2 | 3 | 4 |
|---|---|---|---|---|
| EB inv. Example/VB comp. example | VB | EB | EB | EB |
| TPU 1 | 100 | 95 | 90 | 85 |
| Glass Bubbles 3M IM16K | — | 5 | 10 | 15 |
| Sum [%] | 100 | 100 | 100 | 100 |

3. Determination of Properties

Mechanical properties were determined on injection molded bodies. The properties for the individual materials are summarized in tables 2, 3 and 4.

TABLE 2 mechanical properties

| | example 1 (VB) | example 2 (EB) | example 3 (EB) | example 4 (EB) |
|---|---|---|---|---|
| Amount hard segment | 53 | 5 | — | — |
| MFR 230° C./2.16 Kg [g/10 min] | 30 | 59 | 71 | 58 |
| Density [g/cm$^3$] | 1.15 | 1.08 | 1.01 | 0.95 |
| Hardness [Shore D] | 57 | 57 | 58 | 59 |
| Tensile strength [MPa] | 43 | 25 | 18 | 17 |
| Elongation at break [%] | 360 | 190 | 100 | 40 |
| Tear propagation resistance [kN/m] | 126 | 121 | 85 | 74 |
| elastic modulus [MPa] | 561 | 492 | 501 | 515 |

TABLE 3

E-modulus over temperature

| | Temperature [° C.] | example 1 (VB) | example 2 (EB) | example 3 (EB) | example 4 (EB) |
|---|---|---|---|---|---|
| elastic modulus [MPa] | 23 | 561 | 492 | 501 | 515 |
| | 0 | 662 | 647 | 624 | 705 |
| | −10 | 762 | 708 | 794 | 1035 |
| | −20 | 900 | 895 | 1190 | 1425 |
| | −30 | 949 | 1120 | 1351 | 1518 |

TABLE 4 impact strength

| | example 1 (VB) | example 2 (EB) | example 3 (EB) | example 4 (EB) |
|---|---|---|---|---|
| Charpy impact strength at 23° C., [kJ/m$^2$] | 0 | 0 | 0 | 0 |
| breaking yes/no | no | no | no | no |
| Charpy impact strength at −20° C., [kJ/m$^2$] | 0 | 0 | 0 | 157.2 |
| breaking yes/no | no | no | no | yes |
| Charpy notched impact strength at 23° C., [kJ/m$^2$] | 0 | 40.7 | 16.5 | 10.5 |
| breaking yes/no | no | yes | yes | yes |
| Charpy notched impact strength at −20° C., [charpy kJ/m$^2$] | 117.9 | 13.9 | 8.4 | 5.9 |
| breaking yes/no | yes | yes | yes | yes |

The examples show that the addition of glass bubbles results in a significant reduction of the density of the materials obtained. The increase of the E-modulus (%) with decreasing temperature is surprisingly low. At the same time, the materials have good mechanical properties, in particular good impact strength at low temperatures. The materials according to the invention allow to produce for example ski boots with reduced weight.

4. Methods

| | |
|---|---|
| Melt flow ratio (MFR) | DIN EN ISO 1133 |
| Density | DIN EN ISO 1183-1, A |
| Hardness [Shore D] | DIN ISO 7619-1 |
| Tensile strength | DIN EN ISO 527 |
| Elongation at break | DIN EN ISO 527 |
| Tear propagation resistance | DIN ISO 34-1, B (b) |
| elastic modulus | DIN EN ISO 527 |
| Charpy impact strength at 23° C. | DIN EN ISO 179-1/1eU |
| Charpy impact strength at −20° | DIN EN ISO 179-1/1eU |
| Charpy notched impact strength at 23° C. | DIN EN ISO 179-1/1eU |
| Charpy notched impact strength at −20° | DIN EN ISO 179-1/1eU |

The invention claimed is:

1. A process for producing a ski shoe or a part of a ski shoe, the process comprising:
   (A) providing a composition comprising
      (i) a thermoplastic polyurethane (TPU-1) obtained or obtainable by reaction of an isocyanate composition (IZ) comprising MDI with a polyol composition (PZ),
      wherein the polyol composition (PZ) comprises
         at least one polyol (P1), which is at least one polytetrahydrofuran having an average molecular weight Mn in the range from 1200 to 2000 g/mol, and
         a chain extender (KV1), selected from the group consisting of 1,2-ethandiol, 1,3-propanediol, 1,4-butanediol, and 1,6-hexanediol; and
      (ii) hollow glass microspheres; and
   (B) producing a ski shoe or a part of a ski shoe from the composition provided in (A).

2. The process according to claim 1, wherein the at least one polyol (P1) is at least one polytetrahydrofuran having an average molecular weight Mn in the range from 1300 to 1900 g/mol.

3. The process according to claim 1, wherein the chain extender (KV1) is 1,4-butanediol.

4. The process according to claim 1, wherein the thermoplastic polyurethane (TPU-1) has a hard phase fraction of greater than 0.40, wherein the hard phase fraction is defined by the following formula $$\text{Hard phase fraction} = \left\{ \sum_{x=1}^{x} [(m_{KVx}/M_{KVx}) * M_{Iso} + m_{KVx}] \right\} / m_{ges}$$

having the following definitions:
$M_{KVx}$: molar mass of a chain extender x in g/mol,
$m_{KVx}$: mass of the chain extender x in g,
$M_{Iso}$: molar mass of an employed isocyanate in g/mol,
$m_{ges}$: total mass of all starting materials in g, and
x: number of chain extenders.

5. The process according to claim 1, wherein a glass of the hollow glass microspheres is a soda-lime borosilicate glass.

6. The process according to claim 1, wherein the hollow glass microspheres have an average diameter in the range of from 5 to 100 μm.

7. The process according to claim 1, wherein the composition comprises the hollow glass microspheres in an amount of from 1 to 25 weight %, based on a sum of the components (i) and (ii).

8. The process according to claim 1, wherein in (B), the producing comprises injection molding the composition.

9. A ski shoe or part of a ski shoe, obtained or obtainable according to the process according to claim 1.

10. The process according to claim 1, wherein said composition has an elastic modulus of greater than 150 MPa.

11. The process according to claim 1, wherein said MDI is 4,4'-MDI.

12. The process according to claim 1, wherein said thermoplastic polyurethane has an elastic modulus in a range from 150 to 1,100 MPa.

13. The process according to claim 1, wherein said thermoplastic polyurethane has an elastic modulus in a range from 400 to 1,000 MPa.

14. The process according to claim 1, wherein said thermoplastic polyurethane has a Charpy notched impact strength at −20° C. of greater than 5 KJ/m$^2$.

15. The process according to claim 1, wherein said thermoplastic polyurethane has a Charpy notched impact strength at −20° C. of greater than 10 KJ/m$^2$.

16. The process according to claim 1, wherein a ratio of polyols to total chain extenders of 1:1 to 1:15.

17. The process according to claim 1, wherein said thermoplastic polyurethane has an average molecular weight Mw in a range from 50,000 to 200,000 Dalton.

18. The process according to claim 1, wherein the hollow glass microspheres have an average diameter in the range of from 20 to 40 μm.

19. The process according to claim 1, wherein the composition comprises the hollow glass microspheres in an amount of from 5 to 10 weight %, based on a sum of the components (i) and (ii).

20. The process according to claim 1, wherein said composition has a density of below 1.1 g/cm$^3$ and an elastic modulus of greater than 150 MPa.

* * * * *